Nov. 3, 1970 R. W. BRENNEN 3,538,445
DIFFERENTIAL TWO-WAY COMPARATOR
Filed Nov. 14, 1968
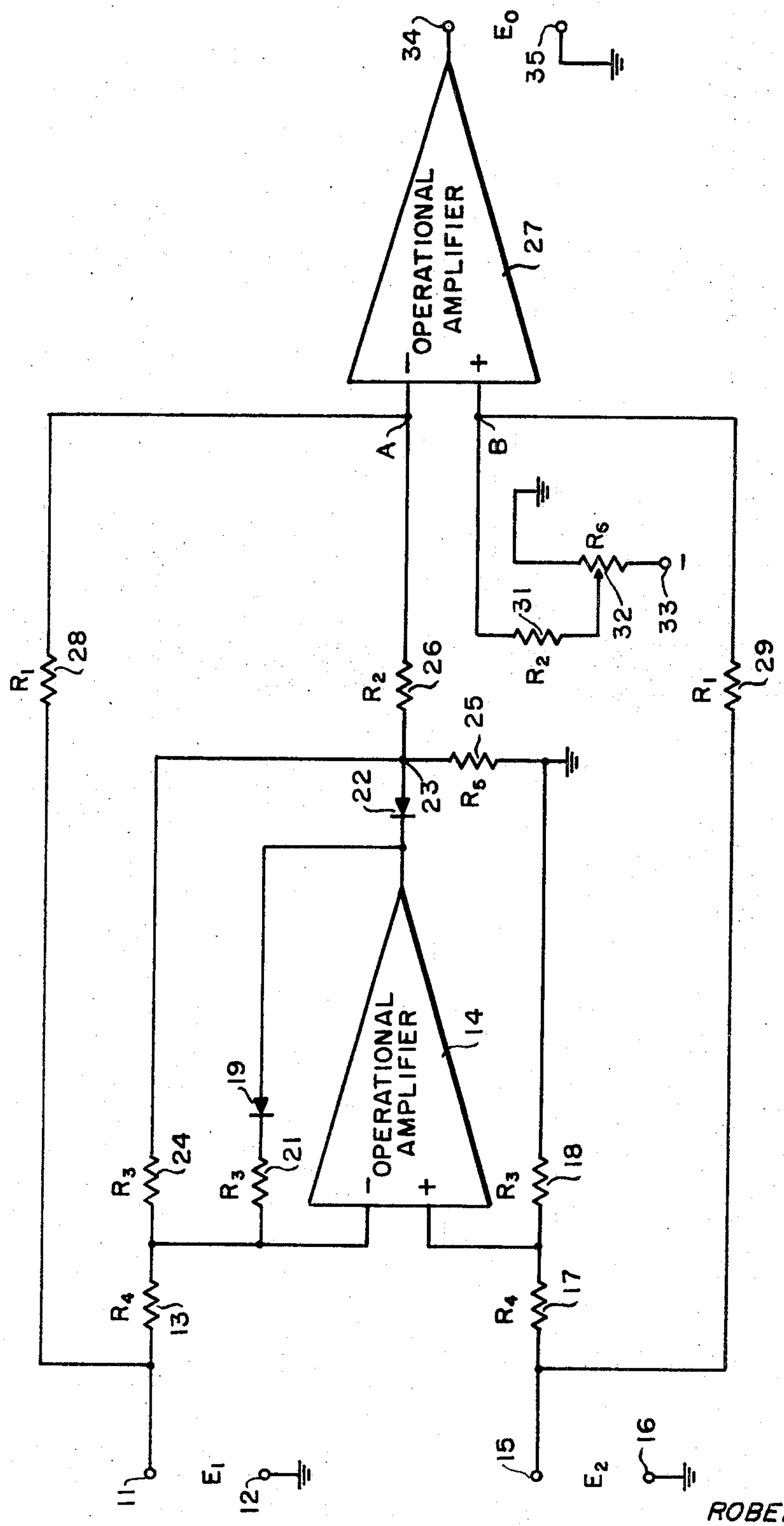
INVENTOR
ROBERT W. BRENNEN
BY H. H. Losche
ATTORNEY United States Patent Office 3,538,445
Patented Nov. 3, 1970

3,538,445
DIFFERENTIAL TWO-WAY COMPARATOR

Robert W. Brennen, Wylie, Tex., assignor, by mesne assignments, to the United States of America as represented by the Secretary of the Navy Filed Nov. 14, 1968, Ser. No. 775,746
Int. Cl. G06g 7/14
U.S. Cl. 328—147 4 Claims

ABSTRACT OF THE DISCLOSURE

A differential comparator circuit for monitoring the relative magnitudes of two variable input signals and providing a negative output potential so long as the absolute value of the algebraic difference between the two input signals remains below an adjustable predetermined value, then switching to a positive output potential when the absolute value of this difference exceeds the preset level. The first stage of the two-stage comparator circuit is comprised of an operational amplifier with feedback, a pair of semiconductor diodes, and various resistances, which provide differential input means with half wave rectification to a second stage differential comparator comprised of a second, switching operational amplifier without feedback, a source of adjustable reference potential, and various resistance means. The output potential of the second operational amplifier remains negative until the absolute difference between the two input signals exceeds the predetermined value, causing it to switch to a positive potential.

BACKGROUND OF THE INVENTION

This invention is in the field of electrical sum and difference amplifiers, and more specifically in the area of solid state differential voltage comparator circuitry for continuously monitoring two variable input signals and producing an indication of the relative level of the absolute value of their algebraic difference with respect to an adjustable preset level.

In the design and development of various electronic systems, both military and commercial, a need often arises for some type of comparison circuit to monitor a pair of variable signals and provide a continuing indication of the relative level of the algebraic difference between the two signals with respect to a predetermined reference level. This continuing indication may be utilized to initiate an alarm and/or to operate various forms of logic, switching, or control circuitry whenever the difference between the input signals exceeds the predetermined reference level, or whenever the difference drops below the reference level, depending upon the requirements of a particular application. The present invention fulfills this need.

SUMMARY OF THE INVENTION

The present invention provides voltage comparison means for monitoring two variable input potentials and producing a relatively constant level, negative output potential so long as the absolute value of the difference between the two input potentials remains below an adjustable preset reference level, then switching to a relatively constant level positive output potential whenever the difference exceeds the reference level.

The invention is comprised of a two stage differential comparator circuit in which the first stage includes a first operational amplifier having differential inputs, feedback means, and a semiconductor diode for providing half wave rectification of any output signal therefrom. Each of the two amplifier inputs is resistively coupled to a respective input terminal for coupling to one of the variable input signals to be monitored. The second stage includes a second operational amplifier, without feedback, which serves as a switching differential comparator, a source of adjustable reference potential, and various resistance means. Each of the two inputs of this second operational amplifier serves as a summing point for a different pair of voltages. Its negative, or inverting, input terminal is resistively coupled to the output of the first stage and to one of the first stage input terminals, while its positive, or non-inverting, input terminal is resistively coupled to the other first stage input terminal and to a source of adjustable reference potential. The reference potential is preset so as to bias the second stage operational amplifier at a level such that its output signal will remain negative unless, and until, the absolute value of the algebraic difference between the variable input signals to be monitored exceeds the predetermined value, at which time its output signal will switch to a positive potential and remain at that potential until this difference again decreases below the predetermined value.

BRIEF DESCRIPTION OF THE DRAWING

The objects and attendant advantages, features, and uses of the invention will become apparent from the following detailed description when considered in conjunction with the accompanying figure of drawing which depicts a schematic diagram of a suitable embodiment of the invention.

DESCRIPTION OF THE PREFERRED EMBODIMENT

Referring more particularly to the embodiment of the invention shown in the figure of drawing, a first pair of input terminals 11 and 12 are provided for receiving one of the two variable input signals $E_1$ and $E_2$ to be monitored. Input terminal 11 is coupled via a resistance 13 to the negative, or inverting, input terminal of a first operational amplifier 14. A second pair of input terminals 15 and 16 are provided for receiving the other input signal, terminal 15 being coupled via a resistance 17 to the positive, or non-inverting, input terminal of amplifier 14. This positive terminal of amplifier 14 is also coupled via a resistance 18 to ground potential. The output of operational amplifier 14 is coupled via a first feedback path comprised of a semiconductor diode 19 and a resistance 21 to its inverting input terminal, and via a semiconductor diode 22 to a junction point 23. Junction point 23 is coupled via a resistance 24 to the inverting input of amplifier 14 forming a second feedback path therefor, via a resistance 25 to ground potential, and via a resistance 26 to a summing point A at the negative input terminal of a second operational amplifier 27. Summing point A is also coupled via a resistance 28 to input terminal 11. A summing point B located at the positive input terminal of amplifier 27 is coupled via a resistance 29 to input terminal 15, and via a resistance 31 and a potentiometer 32 to a source of negative direct current reference potential 33. The ouput potential level $E_0$ appears across a pair of output terminals 34 and 35 of amplifier 27, to be utilized for any desired application such as initiating an alarm or operating some form of logic or control circuitry. The output potential $E_0$ will remain at a negative level, determined by the operating characteristics of amplifier 27, so long as the absolute value of the algebraic difference between the variable input potentials $E_1$ and $E_2$ remains less than the desired predetermined comparison level, established by the reference potential applied to summing point B via resistance 31 and potentiometer 32. When the absolute value of this difference exceeds the desired preset comparison level, the circuit will cause the output potential $E_0$ to switch to a positive level, established by amplifier 27, for so long as this difference exceeds the comparison level.

The circuit has balanced inputs, as indicated in the figure of drawing by the like resistance designations, in addition to the reference numerals, for resistances of equal value. For example, resistances 28 and 29 are of equal value and, accordingly, both are designated $R_1$. These resistance designations have been added to simplify the later analysis of the circuit.

In order to insure proper functioning of the embodiment of the invention shown in the figure of drawing, the values of the various resistances should be selected to satisfy the input impedance and voltage requirements in accordance with the common mode capabilities of the particular operational amplifier units to be utilized in a specific application, as will be understood by those skilled in the art. In addition, the following relative relationships should be observed in the selection of the resistances:

$R_5$(element 25) $<<R_3$(elements 18, 21, 24)

$R_6$(element 32) $<<R_2$(elements 26, 31)

and $R_1$(elements 28, 29) $=2N\cdot R_2$(elements 26, 31)

where $N=R_4$(elements 13, 17)$/R_3$(elements 18, 21, 24)

The following Tables I and II list representative values for the resistances of the first stage of the invention for high level input signals (where $E_1$ and $E_2$ are expected to be in the tens of volts range) and for low level input signals (where $E_1$ and $E_2$ are expected to be in the hundreds of millivolts range), especially. While these examples of suitable values for the various resistances are provided herein, it is to be understood that they are not intended to limit the invention thereto, since other values may be utilized to accomplish similar results, so long as the relative relationships set forth above are observed.

Table I

| Resistances: | Value, ohms |
|---|---|
| $R_3$(elements **18, 21, 24**) | 500,000 |
| $R_4$(elements **13, 17**) | 1,000,000 |
| $R_5$(element **25**) | 5,000 |

For the above values:

$$N=\frac{R_4}{R_3}=\frac{1,000,000}{500,000}=2$$

and $$R_1=2NR_2=4R_2$$

Table II

| Resistances: | Value, ohms |
|---|---|
| $R_3$ (elements **18, 21, 24**) | 1,000,000 |
| $R_4$ (elements **13, 17**) | 100,000 |
| $R_5$ (element **25**) | 5,000 |

For the above values:

$$N=\frac{R_4}{R_3}=\frac{100,000}{1,000,000}=\frac{1}{10}$$

and $$R_1=2NR_2=\cdot 2R_2$$

OPERATION

The operation of the differential comparator circuit comprising the invention occurs in the following manner. With reference to the figure of drawing, it will be assumed that any necessary bias potentials for operational amplifiers 14 and 27 have been provided and that a suitable negative potential 33 is coupled across potentiometer 32.

The two variable voltages to be monitored, $E_1$ and $E_2$, are coupled to input terminal pairs 11–12 and 15–16, and each may vary between positive and negative polarity levels, as might be required by a particular application. Thus, the comparator of this invention provides "two way" operation, in that it will provide its output comparison regardless of whether its input signals $E_1$ and $E_2$ are of the same polarity or of different polarities. The detection level for determining the point at which operational amplifier 27 will cause the output potential $E_0$ to switch from positive to negative, or vice versa, should be preset by adjusting potentiometer 32 so that the voltage, $\Delta V$, between its movable contact arm and ground potential is equal to the following value:

$$\Delta V=-\frac{|E_1-E_2|}{2N}$$

(desired difference at the switching point)

For example, using the value of $N=2$ from Table I, and it being desired that the output potential $E_0$ switch from a negative level to a positive level whenever the absolute value of the algebraic difference between $E_1$ and $E_2$ exceeds 8 volts, i.e., whenever $|E_1-E_2|>8$, then potentiometer 32 should be adjusted so that $\Delta V$ has the following value:

$$\Delta V=-\frac{|E_1-E_2|}{2N}=-\frac{8}{4}=-2 \text{ volts}$$

Potentiometer 32 may be preset to provide the desired voltage $\Delta V$ by placing a voltmeter between ground potential and its movable contact and adjusting the contact until an indication of −2 volts is obtained. As an alternative, known values of $E_1$ and $E_2$ may be applied to their respective input terminals such that $|E_1-E_2|=8$ volts and potentiometer 32 adjusted to the point where a slight decrease in the difference between $E_1$ and $E_2$ will cause $E_0$ to switch from positive to negative.

Having adjusted potentiometer 32 to provide the proper value of $\Delta V$ from negative source 33 to summing point B, the comparator is ready for operation. So long as the absolute value of the algebraic difference between $E_1$ and $E_2$ ($|E_1-E_2|$ or $|E_2-E_1|$) remains less than the desired 8 volts (for which difference, $\Delta V$ was calculated to be −2 volts, and potentiometer 32 was preset accordingly), the invention will cause operational amplifier 27 to produce a negative level output potential $E_0$. However, if the absolute value of the algebraic difference between $E_1$ and $E_2$ increases above 8 volts, the invention will cause amplifier 27 to switch $E_0$ to a positive level for so long as that difference remains above the desired 8 volt monitoring level.

CIRCUIT ANALYSIS

As will be understood by those skilled in the art, a circuit analysis of the first stage of the invention, which includes operational amplifier 14, diodes 19 and 22, and resistances 13, 17, 18, 21, 24, and 25, will reveal the following relationships:

For $E_1>$(more positive or less negative than) $E_2$, $$E_{23}=\frac{1}{N}(E_2-E_1)$$

where $E_{23}$ is the voltage at junction point 23, and $1/N=R_3/R_4$=gain of operational amplifier 14;

For $E_1<$(more negative or less positive than) $E_2$, $$E_{23}=E_2\cdot\frac{R_3}{R_3+R_4}\cdot\frac{R_5}{R_3+R_5}$$

Since $R_5$ is selected to be $\ll$ than $R_3$, $$\frac{R_5}{R_3+R_5}\simeq 0$$

then for $E_1<E_2$, $$E_{23}\simeq E_2\cdot\frac{R_3}{R_3+R_4}\cdot(0)\simeq 0$$

To the extent that $E_{23}$ is not equal to zero when $E_1<E_2$, there will be an inherent error voltage produced at summing point A which has been found to be equal to $2N\cdot E_{23}$. The existence of this small inherent error voltage when $E_1<E_2$, has not been found to be objectionable in any application of the invention and it may be minimized by initially selecting resistance values such that N, or $R_4/R_3$, is kept small, and $R_3/R_5$ is made large. Therefore, for the remaining analysis of the circuit it will be assumed that for $E_1<E_2$, $E_{23}=0$.

Analysis of the second stage of the invention, which includes operational amplifier 27, negative potential source 33, potentiometer 32, and resistances 26, 28, 29, and 31, reveals the following relationships, where voltages $E_A$ and $E_B$ represent the potentials at summing points A and B of the switching differential comparator operational amplifier 27:

For $E_1>E_2$, $$E_A=E_1\cdot\frac{R_2}{R_1+R_2}+\frac{E_2-E_1}{N}\cdot\frac{R_1}{R_1+R_2}$$

$$E_B=E_2\cdot\frac{R_2}{R_1+R_2}+\Delta V_1\cdot\frac{R_1}{R_1+R_2}$$

At the switching point of amplifier 27, $E_A$ must equal $E_B$, therefore $$E_1\cdot\frac{R_2}{R_1+R_2}+\frac{E_2-E_1}{N}\cdot\frac{R_1}{R_1+R_2}=E_2\cdot\frac{R_2}{R_1+R_2}+\Delta V_1\cdot\frac{R_1}{R_1+R_2}$$

solving for $\Delta V_1$, $$\Delta V_1=(E_2-E_1)\cdot\frac{R_1-NR_2}{NR_1}$$

at the switching point for $E_1>E_2$.

For $E_1<E_2$, $$E_A=E_1\cdot\frac{R_2}{R_1+R_2}+0\cdot\frac{R_1}{R_1+R_2}=E_1\cdot\frac{R_2}{R_1+R_2}$$

$$E_B=E_2\cdot\frac{R_2}{R_1+R_2}+\Delta V_2\cdot\frac{R_1}{R_1+R_2}$$

Again, at the switching point of amplifier 27, $E_A$ must equal $E_B$ therefore $$E_1\cdot\frac{R_2}{R_1+R_2}=E_2\cdot\frac{R_2}{R_1+R_2}+\Delta V_2\cdot\frac{R_1}{R_1+R_2}$$

$$\Delta V_2=\frac{R_2}{R_1}(E_1-E_2)=-\frac{R_2}{R_1}(E_2-E_1)$$

Now, since $\Delta V_1$ is the reference level for $E_1>E_2$ and $\Delta V_2$ is the reference level for $E_2>E_1$ (or $E_1<E_2$), if the invention is to function for comparisons where $E_1$ may be of either polarity and $E_2$ may also be of either polarity, then the following relationship of $\Delta V_1$ to $\Delta V_2$ must exist:

$$\Delta V_1=-\Delta V_2$$

then $$(E_2-E_1)\cdot\frac{R_1-NR_2}{NR_1}=\frac{R_2}{R_1}(E_2-E_1)$$

solving for $R_1$, $$R_1=2NR_2$$

subsituting $2NR_2$ for $R_1$ in the equation for $\Delta V_1$ yields $$\Delta V=\frac{(E_2-E_1)}{2N}=-\frac{|E_1-E_2|}{2N}$$

The above solution of the circuit equations for $\Delta V$ and the relationship of $R_1$ to $R_2$ verifies the values of those elements previously stated in the "OPERATION" section.

Thus it may be seen, in view of the foregoing explanation and figure of drawing, that the invention, a solid state differential voltage comparator circuit, is a useful and necessary device having utility for monitoring a pair of variable signals and providing a continuous indication of the relative level of the algebraic difference therebetween for operating various forms of logic, switching or control circuitry.

While many modifications may be made in the disclosed embodiment of the invention by utilizing different resistance values and various types of operational amplifiers, it is to be understood that I desire to be limited in the spirit of my invention only by the scope of the appended claims.

I claim:

1. A solid state differential comparator circuit for continuously monitoring the magnitudes of two variable input signals and providing an indication of the relative magnitude of their difference, comprising:

first and second input means, each said input means for receiving one of said variable input signals to be monitored;

a differential amplifying means, having first and second input terminals and an output terminal, for providing an output signal proportional to the difference between two input signals;

first and second resistance means, said first resistance means coupling said first input means to said first input terminal and said second resistance means coupling said second input means to said second input terminal of said differential amplifying means, for supplying thereto said variable input signals to be monitored;

a differential comparator means having first and second input terminals and an output terminal for providing an output signal whose polarity is indicative of the relative magnitude of the difference between said variable input signals to be monitored;

third and fourth resistance means, said third resistance means coupling said first input means to said first input terminal and said fourth resistance means coupling said second input means to said second input terminal of said differential comparator means;

a first unidirectional semiconductor means having an anode and a cathode electrode, said cathode electrode being coupled to said output terminal of said differential amplifying means;

a fifth resistance means coupled in series between said anode electrode of said first unidirectional semiconductor means and said first input terminal of said differential comparator means;

a source of adjustable negative reference potential;

a sixth resistance means coupled in series between said source of reference potential and said second input terminal of said differential comparator means;

a seventh resistance means coupled between said anode electrode of said first unidirectional semiconductor means and ground potential; and an eighth resistance means coupled between said second input terminal of said differential amplifying means and ground potential.

2. A solid state differential comparator circuit for continuously monitoring the magnitudes of two variable input signals and providing an indication of the relative magnitude of their difference, as set forth in claim 1 wherein:

said differential amplifying means is comprised of a first operational amplifier having both positive and negative feedback means, said positive feedback means comprising a second unidirectional semiconductor means coupled in series with a ninth resistance means between said output terminal and said first input terminal of said first operational amplifier, and said negative feedback means comprising a tenth resistance means coupled between said anode electrode of said first unidirectional semiconductor means and said first input terminal of said first operational amplifier.

3. A solid state differential comparator circuit for continuously monitoring the magnitudes of two variable input signals and providing an indication of the relative magnitude of their difference, as set forth in claim 2 wherein:

said differential comparator means is comprised of a second operational amplifier.

4. A solid state differential comparator circuit for continuously monitoring the magnitudes of two variable input signals and providing an indication of the relative magnitude of their difference, as set forth in claim 3 wherein:

said first and second resistance means are of equal ohmic value, said third and fourth resistance means are of equal ohmic value, said fifth and sixth resistance means are of equal ohmic value, said eighth, ninth, and tenth resistance means are of equal ohmic value, said seventh resistance means is much smaller in ohmic value than said eighth, ninth, and tenth resistance means, and the ratio of the ohmic values of said third resistance means to said fifth resistance means is equal to two times the ratio of the ohmic values of said first resistance means to said tenth resistance means.

References Cited

UNITED STATES PATENTS 3,430,053 2/1969 Westhauer ........... 330—30

DONALD D. FORRER, Primary Examiner

D. M. CARTER, Assistant Examiner

U.S. Cl. XR

307—235; 330—69